US011949550B2

(12) United States Patent
Matsumoto et al.

(10) Patent No.: US 11,949,550 B2
(45) Date of Patent: Apr. 2, 2024

(54) RELAY DEVICE, COMMUNICATION METHOD, AND RECORDING MEDIUM RECORDING COMMUNICATION PROGRAM

(71) Applicant: TOYOTA JIDOSHA KABUSHIKI KAISHA, Toyota (JP)

(72) Inventors: Hiroya Matsumoto, Toyota (JP); Yoshiroh Hirata, Toyota (JP); Hiroshi Ota, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/943,549

(22) Filed: Sep. 13, 2022

(65) Prior Publication Data

US 2023/0142524 A1 May 11, 2023

(30) Foreign Application Priority Data

Nov. 5, 2021 (JP) .................................. 2021-181156

(51) Int. Cl.
*H04L 41/06* (2022.01)
*H04L 1/00* (2006.01)

(52) U.S. Cl.
CPC ............ *H04L 41/06* (2013.01); *H04L 1/0002* (2013.01)

(58) Field of Classification Search
CPC ....... H04L 1/0002; H04L 12/12; H04L 41/06; H04L 2001/0097
See application file for complete search history.

(56) References Cited

U.S. PATENT DOCUMENTS

| | | | |
|---|---|---|---|
| 2011/0134801 A1 | 6/2011 | Maruhashi | |
| 2015/0148965 A1* | 5/2015 | Lemire | H04L 67/10 700/276 |
| 2019/0199538 A1* | 6/2019 | Lagrange | G06F 1/24 |
| 2021/0058413 A1* | 2/2021 | Fujii | H04L 63/1466 |

FOREIGN PATENT DOCUMENTS

| | | |
|---|---|---|
| JP | 2005-086642 A | 3/2005 |
| JP | 2011-124641 A | 6/2011 |

\* cited by examiner

*Primary Examiner* — Gil H. Lee
(74) *Attorney, Agent, or Firm* — Oliff PLC

(57) ABSTRACT

A relay device that performs reset processing in relation to wired communication with a first device in response to a change in a communication rate of the wired communication with the first device; and in response to performing the reset processing, start control to transmit a predetermined message to a second device even though there is no transmission from the first device, the predetermined message being expected to be transmitted from the first device to the second device.

17 Claims, 5 Drawing Sheets

RELAY DEVICE, COMMUNICATION METHOD, AND RECORDING MEDIUM RECORDING COMMUNICATION PROGRAM

CROSS-REFERENCE TO RELATED APPLICATION

This application is based on and claims priority under 35 USC 119 from Japanese Patent Application No. 2021-181156 filed on Nov. 5, 2021, the disclosure of which is incorporated by reference herein.

BACKGROUND

Technical Field

The present disclosure relates to a relay device, a communication method, and a recording medium recording a communication program.

Related Art

In a local area network (LAN) standard such as Ethernet (registered trademark) or the like, a communication rate can be switched. Japanese Patent Application Laid-Open (JP-A) No. 2005-086642 discloses a technology that, during or after establishment of a connection, switches a transfer rate when a cumulative amount of communication errors reaches a threshold value or greater. JP-A No. 2011-124641 discloses a technology that conducts autonegotiation in a suitable range of communication rates without a user being aware of how categories of LAN cables match the communication rates.

Reset processing of a communication device is performed when a communication rate is to be switched. However, when reset processing of a communication device is performed, communication with the communication device is temporarily not possible. When another communication device is conducting communication with the communication device performing the reset processing but no messages reach the another communication device from the communication device performing the reset processing, the another communication device may detect an error.

SUMMARY

An aspect of the present disclosure is a relay device that includes: a memory, and a processor coupled to the memory, the processor being configured to: perform reset processing in relation to wired communication with a first device in response to a change in a communication rate of the wired communication with the first device; and in response to performing the reset processing, start control to transmit a predetermined message to a second device even though there is no transmission from the first device, the predetermined message being expected to be transmitted from the first device to the second device.

DETAILED DESCRIPTION

—Circumstances—

To facilitate understanding of an exemplary embodiment of the present disclosure, first, the circumstances in which the exemplary embodiment of the present disclosure was reached are described.

In a LAN standard such as Ethernet or the like, a communication rate can be switched. For example, when communication errors are occurring, the communication rate is switched so as to lower the communication rate in order to prevent communication errors, and when the situation returns to normal, the communication rate is switched to restore the original communication rate.

Figure 1:
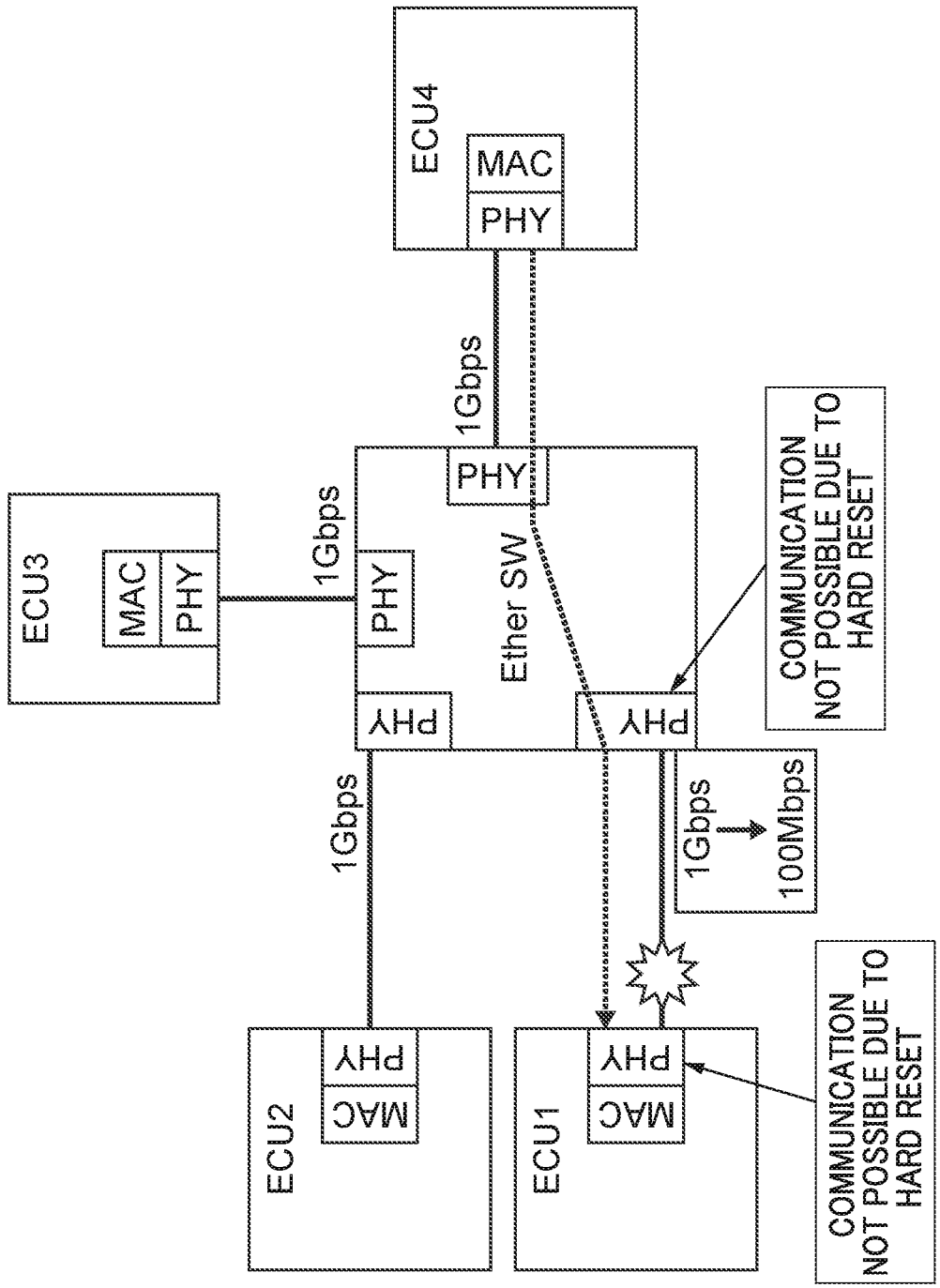
FIG. 1 is a diagram describing an example of a situation in which a communication rate in a LAN standard is switched.

FIG. 1 is a diagram describing a situation in which a communication rate in a LAN standard is switched. FIG. 1 depicts a situation in which four electronic control units (ECUs) are connected to an Ethernet switch (Ether SW). The four ECUs are denoted as, respectively, ECU1 to ECU4. When communication errors occur between the Ethernet switch and ECU1, due to external noise superimposing on a communication line between the Ethernet switch and ECU1 or the like, the communication rate between the Ethernet switch and ECU1 is lowered in order to reduce the error rate. When the communication rate is to be lowered, the Ethernet switch and the ECU1 turn off autonegotiation and execute reset processing. The reset processing at the Ethernet switch is conducted only for a port that is connected to ECU1. When the reset processing has been completed, the Ethernet switch and ECU1 conduct communications at a low rate. For example, usual communication between the Ethernet switch and ECU1 is conducted at 1 Gbps, and when the communication rate is switched to a low rate, communication is conducted at 100 Mbps.

In order to switch the communication rate between the Ethernet switch and ECU1 in this manner, it is necessary to turn off autonegotiation and perform the reset processing. However, while the reset processing is being performed at the Ethernet switch and ECU1, communications cannot be conducted between ECU1 and the other ECUs. Therefore, ECU2 to ECU4 cannot communicate with ECU1 while the reset processing is being performed at the Ethernet switch and ECU1. Thus, messages expected in communications with ECU1 are not sent, and ECU2 to ECU4 may detect ECU1 as being faulty.

Accordingly, the inventors have conducted diligent investigations into technologies for, while reset processing is being performed at a communication device and a relay device in order to switch a communication rate, suppressing a case of the communication device that is conducting the reset processing being detected as faulty by another communication device. As a result, the inventors of the present disclosure have succeeded in devising a technology that, as described below, suppresses a case of another communication device detecting a communication device that is performing reset processing as being faulty.

Exemplary Embodiment

Below, an example of an embodiment of the present disclosure is described with reference to the drawings. In the drawings, structural elements and portions that are the same or equivalent are assigned the same reference symbols. Dimensional proportions in the drawings are determined by convenience and may be different from actual proportions.

Figure 2:
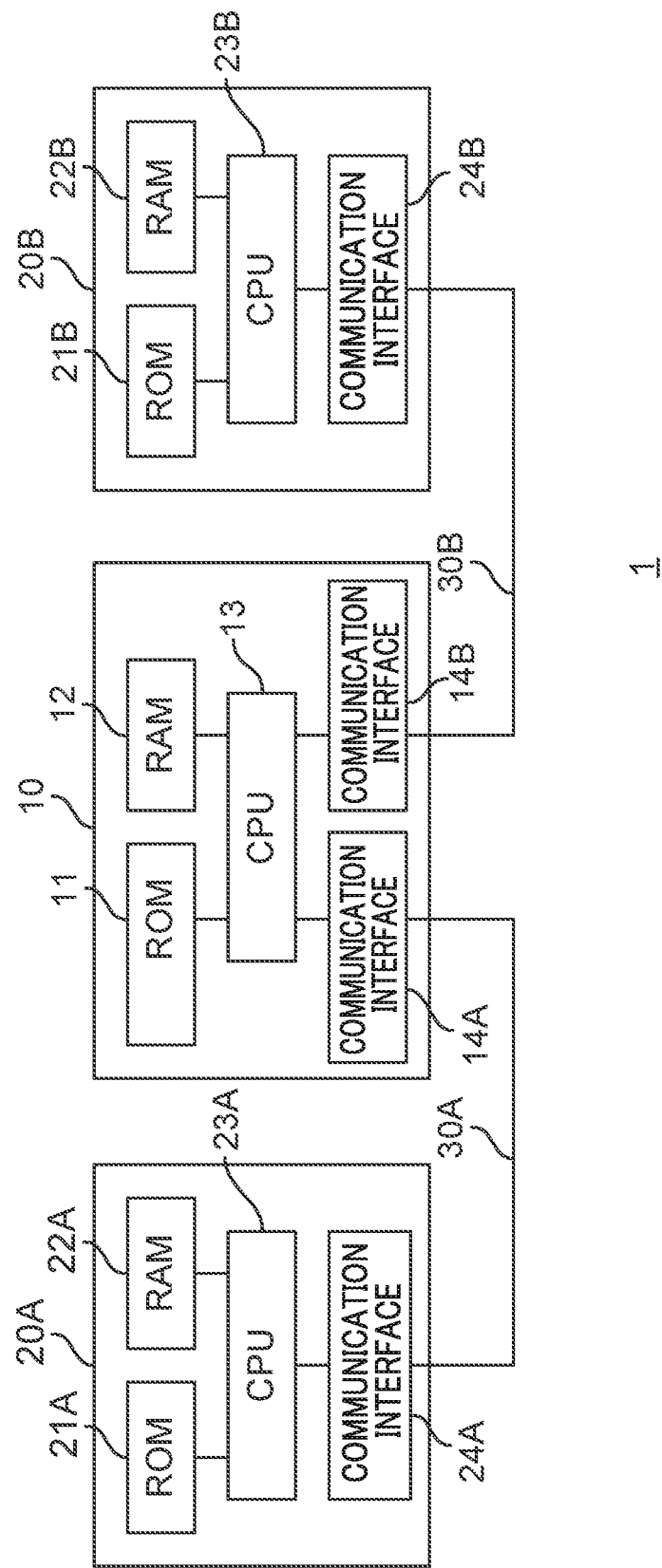
FIG. 2 is a diagram showing an example of schematic structures of a communication system according to an exemplary embodiment of the disclosure.

FIG. 2 is a diagram showing schematic structures of a communication system according to the present exemplary embodiment. A communication system 1 shown in FIG. 2 is, for example, a communication system provided in a vehicle. The communication system 1 is provided with a relay device 10 and ECUs 20A and 20B. The relay device 10 and ECU 20A are connected by a communication line 30A, and the relay device 10 and ECU 20B are connected by a communication line 30B. The communication lines 30A and 30B are, for example, LAN cables. FIG. 2 shows only the two ECUs 20A and 20B, but the number of ECUs may be three or more.

The relay device 10 is a device that relays communications between the ECUs 20A and 20B. The relay device 10 includes read-only memory (ROM) 11, random access memory (RAM) 12, a central processing unit (CPU) 13, and communication interfaces 14A and 14B.

The ROM 11 stores various programs and various kinds of data. The RAM 12 serves as a workspace, temporarily memorizing programs and data. The CPU 13 is a central arithmetic processing unit, which is an example of a hardware processor, that executes various programs and controls respective sections. That is, the CPU 13 loads a program from the ROM 11, which is an example of memory, and executes the program, using the RAM 12, which is an example of the memory, as a workspace. The CPU 13 implements control of the structures described above and various kinds of computational processing in accordance with programs recorded at the ROM 11. In the present exemplary embodiment, a communication program for communication processing in the communication system 1 is stored at the ROM 11.

The communication interface 14A is an interface for communicating with the ECU 20A and uses, for example, a wired communications standard such as Ethernet or the like. The communication interface 14B is an interface for communicating with the ECU 20B and uses, for example, a wired communications standard such as Ethernet or the like.

The ECU 20A includes ROM 21A, which is equivalent to the memory, RAM 22A, a CPU 23A, which is equivalent to the hardware processor, and a communication interface 24A. Similarly, the ECU 20B includes ROM 21B, which is equivalent to the memory, RAM 22B, a CPU 23B, which is equivalent to the hardware processor, and a communication interface 24B. Hardware structures of the ECU 20A are now described.

The ROM 21A stores various programs and various kinds of data. The RAM 22A serves as a workspace, temporarily memorizing programs and data. The CPU 23A is a central arithmetic processing unit that executes various programs and controls respective parts. That is, the CPU 23A loads a program from the ROM 21A and executes the program, using the RAM 22A as a workspace. The CPU 23A implements control of the structures described above and various kinds of computational processing in accordance with programs recorded at the ROM 21A. In the present exemplary embodiment, a communication program for conducting communications with other ECUs is stored at the ROM 21A.

The communication interface 24A is an interface for communicating with the relay device 10 and uses, for example, a wired communications standard such as Ethernet or the like.

When an above-mentioned communication program is executed, the relay device 10 uses the hardware resources described above to realize various functions. When other above-mentioned communication programs are executed, the ECUs 20A and 20B use the hardware resources described above to realize various functions. Functional structures realized by the relay device 10 and the ECUs 20A and 20B are now described.

Figure 3:
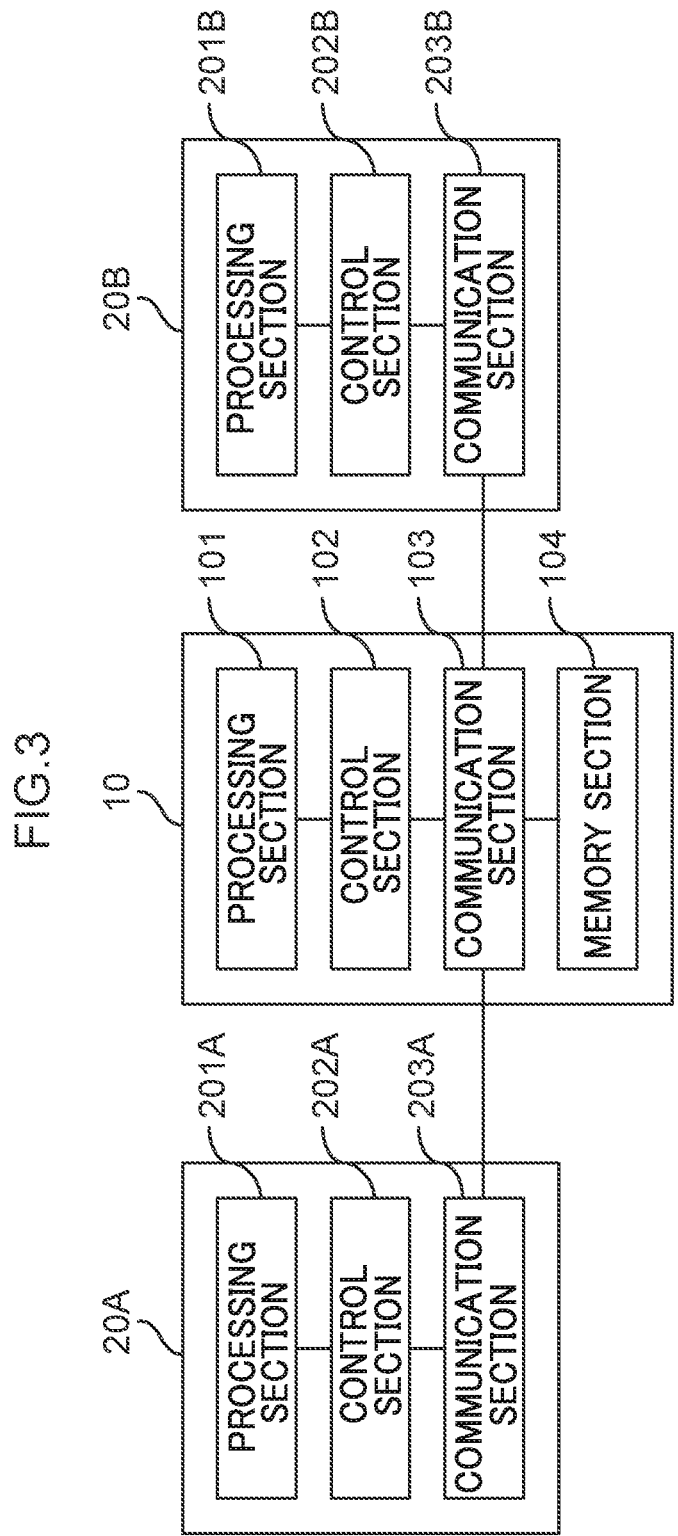
FIG. 3 is a block diagram showing an example of functional structures of a relay device and ECUs.

FIG. 3 is a block diagram showing an example of functional structures of the relay device 10 and the ECUs 20A and 20B.

As shown in FIG. 3, as functional structures, the relay device 10 includes a processing section 101, a control section 102, a communication section 103 and a memory section 104. These functional structures are realized by the CPU 13 loading and executing the communication program memorized at the ROM 11.

When a communication rate of wired communications with the ECU 20A or 20B is to be changed, the processing section 101 performs reset processing in relation to wired communication between the relay device 10 and the ECU 20A or 20B. Changes in the communication rate include both a change to lower the communication rate and a change to raise the communication rate that has been lowered. In the descriptions below, descriptions are given with the ECU 20A corresponding to a first device of the present disclosure and the ECU 20B corresponding to a second device of the present disclosure. The reset processing performed by the processing section 101 is hardware reset processing in the present exemplary embodiment, but the reset processing of the present disclosure may be software reset processing.

A condition for performing the reset processing at the processing section 101 is that a rate of occurrence of communication errors in wired communication with the ECU 20A exceeds a predetermined threshold. More specifically, the processing section 101 uses a case of a sum of a rate of occurrence of communication errors measured at the relay device 10 and a rate of occurrence of communication errors measured at the ECU 20A exceeding a predetermined threshold as a condition for performing reset processing. Accordingly, the processing section 101 measures a number of communication errors occurring in communications with the ECU 20A, and the processing section 101 acquires, via the communication section 103, information on a rate of occurrence of communication errors measured at the ECU 20A. The processing section 101 uses, for example, an error detection code such as CRC16 or the like to measure the number of errors occurring in communications with the ECU 20A. A range of time in which the rate of occurrence of communication errors is measured is not limited to a particular range.

When reset processing in relation to wired communication between the relay device 10 and the ECU 20A is performed by the processing section 101, the control section 102 starts proxy transmission of messages. The meaning of the term "proxy transmission of messages" as used herein is intended to include the relay device 10 transmitting messages that are to be transmitted from the ECU 20A to the ECU 20B in place of the ECU 20A. That is, the control section 102 starts control to transmit predetermined messages, which are expected to be transmitted from the ECU 20A to the ECU 20B, even though there is no transmission from the ECU 20A. The control section 102 may start the control to transmit the predetermined messages from the communication section 103 to the ECU 20B before the reset processing is performed by the processing section 101, and may start the control to transmit the predetermined messages to the ECU 20B after the reset processing is performed by the processing section 101.

The content of a predetermined message that the control section 102 transmits in proxy for the ECU 20A may be content that has actually arrived at the relay device 10 from the ECU 20A, and may be content generated by the relay device 10 in proxy for the ECU 20A. A predetermined message may be, for example, an initial message at a time of power-up, the last message before the start of the reset processing, a message containing a value outside a range of usual messages, or the like.

At a time when the reset processing by the processing section 101 is completed, the control section 102 ends the control to transmit predetermined messages to the ECU 20B even though there is no transmission from the ECU 20A.

The communication section 103 implements communications of messages to and from the ECUs 20A and 20B. The communication section 103 conducts communications with the ECUs 20A and 20B at plural communication rates. The communication section 103 may temporarily memorize messages received from the ECUs 20A and 20B at the memory section 104.

As shown in FIG. 3, as functional structures, the ECU 20A includes a processing section 201A, a control section 202A and a communication section 203A. These functional structures are realized by the CPU 23A loading and executing the communication program memorized at the ROM 21A. The ECU 20B has the same structures as the ECU 20A, but only the functional structures of the ECU 20A are described here.

When the communication rate of communications with the relay device 10 is to be changed, the processing section 201A performs reset processing in relation to communication between the ECU 20A and the relay device 10. Changes in the communication rate include both the change to lower the communication rate and the change to raise the communication rate that has been lowered. The reset processing performed by the processing section 201A is hardware reset processing in the present exemplary embodiment, but the reset processing of the present disclosure may be software reset processing.

A condition for performing the reset processing at the processing section 201A is that a rate of occurrence of communication errors in communication with the relay device 10 exceeds a predetermined threshold. Accordingly, the processing section 201A measures a number of communication errors occurring in communications with the relay device 10. Then the processing section 201A transmits information on the rate of occurrence of communication errors in communications with the relay device 10 to the relay device 10 via the communication section 203A. The processing section 201A uses, for example, an error detection code such as CRC16 or the like to measure the number of errors occurring in communications with the relay device 10.

When the reset processing in relation to communication between the relay device 10 and the ECU 20A is performed by the processing section 201A and the communication rate is lowered, the control section 202A selects priority messages for communicating with other ECUs in advance. Priority messages may differ in accordance with equipment or systems at which the communication system 1 is employed. For example, when the communication system 1 is provided in a vehicle, messages relating to safe running of the vehicle may be selected as priority messages.

The communication section 203A implements communication of messages to and from the relay device 10. The communication section 203A conducts communication with the relay device 10 at plural communication rates.

Now, operation of the relay device 10 and the ECUs 20A and 20B is described.

Figure 4:
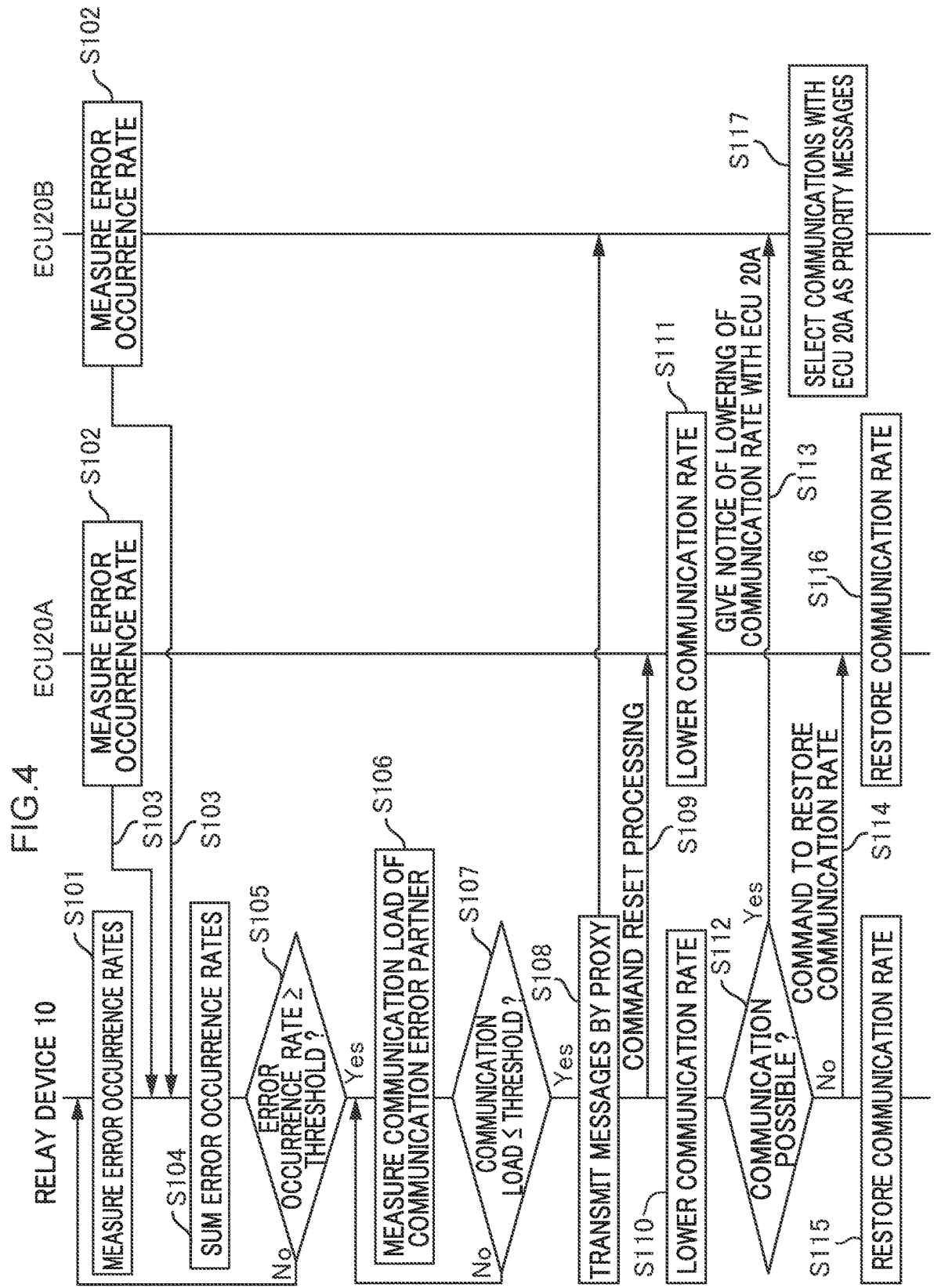
FIG. 4 is a flowchart showing an example of flows of communication processing by the relay device and ECUs.

FIG. 4 is a flowchart showing flows of communication processing by the relay device 10 and the ECUs 20A and 20B. The CPU 13 loads the communication program from the ROM 11 into the RAM 12 and executes the program, and the CPUs 23A and 23B read and load the respective communication programs from the ROMs 21A and 21B into the RAMs 22A and 22B and execute the programs. Thus, the communication processing is performed.

In step S101, the relay device 10 measures rates of occurrence of communication errors in communications with the connected ECUs 20A and 20B. In step S102, the ECUs 20A and 20B measure rates of occurrence of communication errors in communications with the connected relay device 10. In step S103, the ECUs 20A and 20B periodically transmit information on the rates of occurrence of communication errors to the relay device 10.

When the relay device 10 receives the information on rates of occurrence of communication errors that is sent from the ECUs 20A and 20B, in step S104 the relay device 10 sums the respective rates of occurrence of communication errors of the ECUs 20A and 20B.

Then, in step S105, the relay device 10 makes a determination as to whether a rate of occurrence of communication errors summed in step S104 is at least a predetermined threshold value. When the rates of occurrence of communication errors are less than the predetermined threshold ("No" in step S105), the relay device 10 returns to step S101 and measures the rates of occurrence of communication errors in communications with the connected ECUs 20A and 20B. On the other hand, when a rate of occurrence of communication errors is equal to or greater than the predetermined threshold ("Yes" in step S105), then in step S106 the relay device 10 measures a communication load of a communication partner for which the rate of occurrence of communication errors is at least the predetermined threshold. In this example, it is assumed that the rate of occurrence of communication errors is equal to or greater than the predetermined threshold in communications with the ECU 20A.

Then, in step S107, the relay device 10 makes a determination as to whether the communication load measured in step S106 is equal to or less than a predetermined threshold value. The reason for determining whether or not the communication load is at most this predetermined threshold is that if reset processing is executed in a state in which a communication load is high, all messages being communicated are at risk of loss. When the communication load is not equal to or less than the predetermined threshold ("No" in step S107), the relay device 10 returns to step S106 and measures a communication load of another communication partner for which the rate of occurrence of communication errors is at least the predetermined threshold. On the other hand, when the communication load is equal to or less than the predetermined threshold thereof ("Yes" in step S107), in step S108 the relay device 10 starts proxy transmission of messages. Because the relay device 10 conducts proxy transmission of messages, the ECU 20B, which is not subjected to a reset, may be prevented from detecting communication errors due to non-arrival of messages from the ECU 20A.

Then, in step S109, the relay device 10 commands the execution of reset processing in order to lower a communication rate with the ECU 20A.

In step S110, the relay device 10 executes the reset processing and lowers the communication rate of communications with the ECU 20A from the communication rate before the reset processing. In step S111, the ECU 20A executes reset processing in response to the command from the relay device 10 and lowers the communication rate of communications with the relay device 10 from the communication rate before the reset processing. The reset processing in step S110 and step S111 is hardware reset processing in the present exemplary embodiment. However, the present disclosure is not limited to hardware reset processing; software reset processing may be performed.

After step S110, in step S112 the relay device 10 makes a determination as to whether communications with the ECU 20A are possible at the lowered communication rate. The relay device 10 makes the determination as to whether communications with the ECU 20A are possible at the lowered communication rate by, for example, linking up. When the result of this determination is that communications with the ECU 20A are possible at the lowered communication rate ("Yes" in step S112), then in step S113 the relay device 10 gives notice to the ECU 20B of the lowering of the communication rate with the ECU 20A. On the other hand, when the result of the determination is that communications with the ECU 20A are not possible at the lowered communication rate ("No" in step S112), then in step S114 the relay device 10 commands the ECU 20A to restore the communication rate with the ECU 20A to the original rate. After step S114, in step S115 the relay device 10 restores the communication rate of communications with the ECU 20A to the communication rate before the reset processing. In step S116, in response to the command from the relay device 10, the ECU 20A restores the communication rate of communications with the relay device 10 to the communication rate before the reset processing.

In step S113, notice of the lowering of the communication rate with the ECU 20A is sent from the relay device 10 to the ECU 20B. In step S117, the ECU 20B selects priority messages for communication with the ECU 20A and communicates these messages. The ECU 20B conducts communications with communication partners other than the ECU 20A (for example, an ECU other than the ECUs 20A and 20B) by usual communications.

Because the relay device 10 executes the sequence of processing shown in FIG. 4, a case of the ECU 20A that is executing reset processing being mistakenly detected as faulty by the ECU 20B may be suppressed. In the sequence of processing shown in FIG. 4, the relay device 10 starts the proxy transmission of messages before the reset processing, but the relay device 10 may start the proxy transmission of messages after the start of the reset processing.

When the communication system 1 is incorporated in an in-vehicle network, because the relay device 10 executes the sequence of processing shown in FIG. 4 and a case of the ECU 20B mistakenly detecting the ECU 20A as faulty is suppressed, the vehicle may smoothly switch into a limp-home mode in which the vehicle runs at low speed.

Now, flows of processing when the relay device 10 and ECU 20A raise the communication rate therebetween after the communication rate has been lowered are described.

Figure 5:
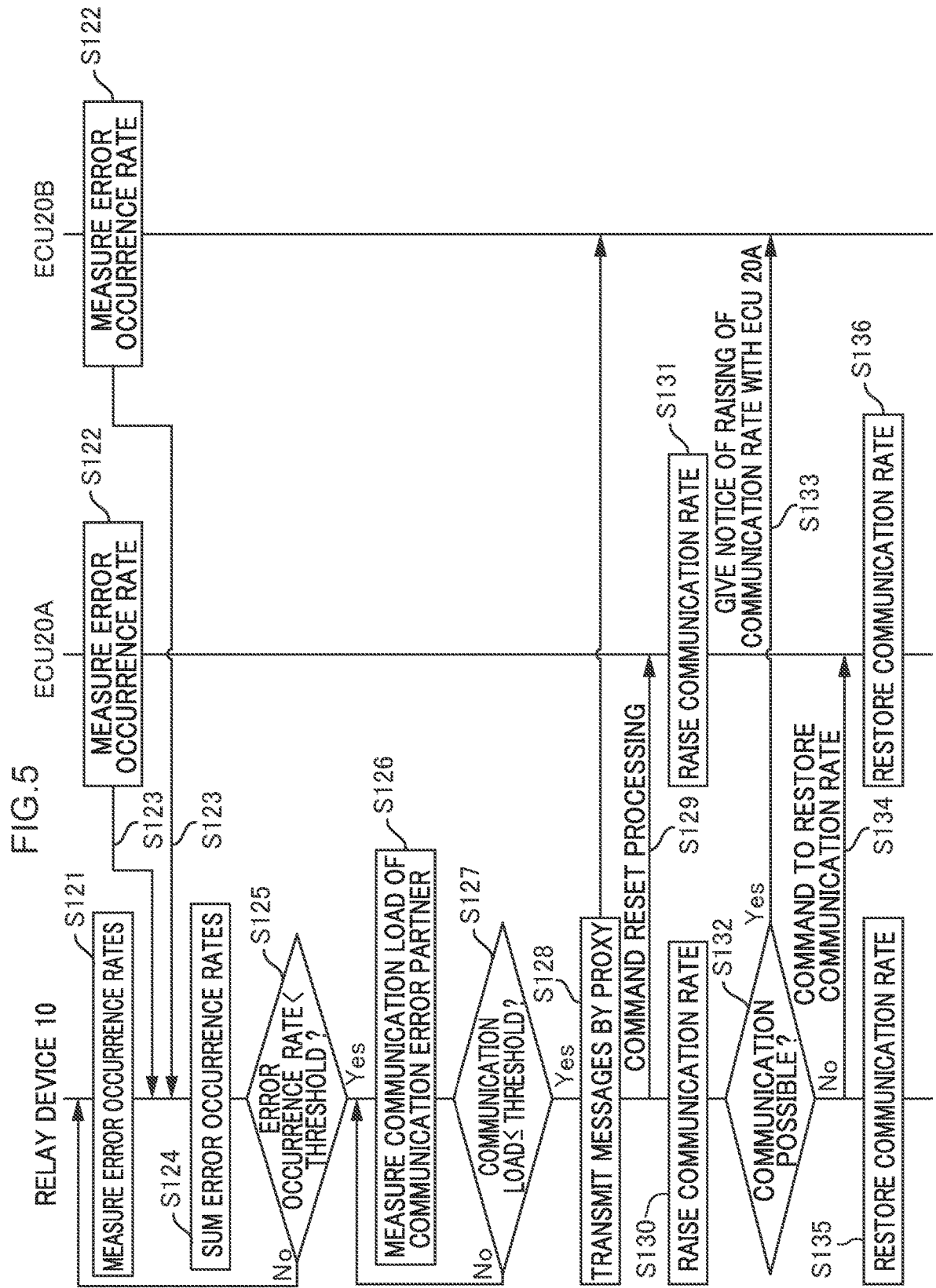
FIG. 5 is a flowchart showing an example of flows of communication processing by the relay device and ECUs.

FIG. 5 is a flowchart showing flows of communication processing by the relay device 10 and the ECUs 20A and 20B. The CPU 13 loads the communication program from the ROM 11 into the RAM 12 and executes the program, and the CPUs 23A and 23B load the respective communication programs from the ROMs 21A and 21B into the RAMs 22A and 22B and execute the programs. Thus, the communication processing is performed.

In step S121, the relay device 10 measures rates of occurrence of communication errors in communications with the connected ECUs 20A and 20B. In step S122, the ECUs 20A and 20B measure respective rates of occurrence of communication errors in communications with the connected relay device 10. In step S123, the ECUs 20A and 20B periodically transmit information on the rates of occurrence of communication errors to the relay device 10.

When the relay device 10 receives the information on rates of occurrence of communication errors that is sent from the ECUs 20A and 20B, in step S124, the relay device 10 sums the respective rates of occurrence of communication errors of the ECUs 20A and 20B.

Then, in step S125, the relay device 10 periodically makes a determination as to whether a rate of occurrence of communication errors summed in step S124 is less than a predetermined threshold value. Since the communication rate between the relay device 10 and the ECU 20A was lowered by the communication processing shown in FIG. 4, the rate of occurrence of communication errors may have improved. Accordingly, the relay device 10 executes the determination processing in step S125 periodically. When this rate of occurrence of communication errors is equal to or greater than the predetermined threshold ("No" in step S125), the relay device 10 returns to step S121 and measures the rates of occurrence of communication errors in communications with the connected ECUs 20A and 20B. On the other hand, when this rate of occurrence of communication errors is less than the predetermined threshold ("Yes" in step S125), then in step S126 the relay device 10 measures a communication load of a communication partner for which the rate of occurrence of communication errors is less than a predetermined threshold. In this example, it is assumed that the rate of occurrence of communication errors is less than the predetermined threshold in communications with the ECU 20A.

Then, in step S127, the relay device 10 makes a determination as to whether the communication load measured in step S126 is equal to or less than a predetermined threshold value. The reason for determining whether or not the communication load is at most this predetermined threshold is that if reset processing is executed in a state in which a communication load is high, all messages being communicated are at risk of loss. When the communication load is not equal to or less than the predetermined threshold ("No" in step S127), the relay device 10 returns to step S126 and measures a communication load of another communication partner for which the rate of occurrence of communication errors is at least the predetermined threshold. On the other hand, when the communication load is equal to or less than the predetermined threshold thereof ("Yes" in step S127), in step S128 the relay device 10 starts proxy transmission of messages. Because the relay device 10 conducts proxy transmission of messages, the ECU 20B, which is not subjected to a reset, may be prevented from detecting communication errors due to non-arrival of messages from the ECU 20A.

Then, in step S129, the relay device 10 commands the execution of reset processing in order to raise the communication rate with the ECU 20A.

In step S130, the relay device 10 executes the reset processing and raises the communication rate of communications with the ECU 20A from the communication rate before the reset processing, restoring the original communication rate. In step S131, the ECU 20A executes the reset processing in response to the command from the relay device 10 and raises the communication rate of communications with the relay device 10 from the communication rate before the reset processing, restoring the original communication rate. The reset processing in step S130 and step S131 is hardware reset processing in the present exemplary embodiment. However, the present disclosure is not limited to hardware reset processing; software reset processing may be performed.

After step S130, in step S132 the relay device 10 makes a determination as to whether communications with the ECU 20A are possible at the raised communication rate. The relay device 10 makes the determination as to whether communications with the ECU 20A are possible at the raised communication rate by, for example, linking up. When the result of this determination is that communications with the ECU 20A are possible at the raised communication rate ("Yes" in step S132), then in step S133 the relay device 10 gives notice to the ECU 20B of the raising of the communication rate with the ECU 20A. On the other hand, when the result of the determination is that communications with the ECU 20A are not possible at the raised communication rate ("No" in step S132), then in step S134 the relay device 10 commands the ECU 20A to restore the communication rate with the ECU 20A to the original rate. After step S134, in step S135 the relay device 10 restores the communication rate of communications with the ECU 20A to the communication rate before the reset processing. In step S136, in response to the command from the relay device 10, the ECU 20A restores the communication rate of communications with the relay device 10 to the communication rate before the reset processing.

Because the relay device 10 executes the sequence of processing shown in FIG. 5, a case of the ECU 20A that is conducting reset processing being mistakenly detected as faulty by the ECU 20B may be suppressed. In the sequence of processing shown in FIG. 5, the relay device 10 starts the proxy transmission of messages before the reset processing, but the relay device 10 may start the proxy transmission of messages after the start of the reset processing.

When the communication system 1 is incorporated in an in-vehicle network, because the relay device 10 executes the sequence of processing shown in FIG. 5 and the ECU 20B mistakenly detecting the ECU 20A as faulty is suppressed, the vehicle may smoothly switch into the limp-home mode in which the vehicle runs at low speed.

The processing that, in the exemplary embodiment described above, is executed by CPUs loading software (programs) may be executed by various kinds of processor other than a CPU. Examples of processors in these cases include a PLD (programmable logic device) in which a circuit configuration can be modified after fabrication, such as an FPGA (field programmable gate array) or the like, a dedicated electronic circuit which is a processor with a circuit configuration that is specially designed to execute specific processing, such as an ASIC (application-specific integrated circuit) or the like, and so forth. The communication processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiment described above, a mode is described in which the communication processing program is memorized in advance (installed) at a ROM, but this is not limiting. The program may be provided in a mode recorded on a non-transitory recording medium, such as a CD-ROM (compact disc read-only memory), DVD-ROM (digital versatile disc read-only memory), USB (universal serial bus) memory or the like. Modes are also possible in which a program is downloaded from external equipment via a network.

An object of the present disclosure is to provide a relay device, a communication method and a recording medium recording a communication program that may, when reset processing is being performed at a communication device, prevent detection of an error by another communication device.

A first aspect of the present disclosure is a relay device that includes: a memory, and a processor coupled to the memory, the processor being configured to: perform reset processing in relation to wired communication with a first device in response to a change in a communication rate of the wired communication with the first device; and in response to performing the reset processing, start control to transmit a predetermined message to a second device even though there is no transmission from the first device, the predetermined message being expected to be transmitted from the first device to the second device.

According to the first aspect of the present disclosure, because messages that are expected to be sent from the first device reach the second device even when the reset processing is being performed at the first device, detection of an error by the second device may be prevented.

A second aspect of the present disclosure is the relay device according to the first aspect, wherein the processor is configured to start the control to transmit the predetermined message to the second device before starting the reset processing.

According to the second aspect of the present disclosure, because messages that are expected to be sent from the first device reach the second device from before the start of the reset processing at the first device, detection of an error by the second device may be prevented.

A third aspect of the present disclosure is the relay device according to the first aspect, wherein the processor is configured to start the control to transmit the predetermined message to the second device after starting the reset processing.

According to the third aspect of the present disclosure, because messages that are expected to be sent from the first device reach the second device, even though after the start of the reset processing at the first device, detection of an error by the second device may be prevented.

A fourth aspect of the present disclosure is the relay device according to any of the first to third aspects, wherein the reset processing is hardware reset processing.

According to the fourth aspect of the present disclosure, because messages that are expected to be sent from the first device reach the second device even when hardware reset processing is being performed at the first device, detection of an error by the second device may be prevented.

A fifth aspect of the present disclosure is the relay device any of according to the first to fourth aspects, wherein the processor is configured to, at a time when the reset processing is completed, end the control to transmit the predetermined message to the second device even though there is no transmission from the first device.

According to the fifth aspect of the present disclosure, when the reset processing at the first device has been completed, messages sent from the first device reach the second device. Thus, duplicate messages arriving at the second device may be prevented.

A sixth aspect of the present disclosure is the relay device according to any of the first to fifth aspects, wherein the processor is configured to, in response to performing the reset processing, give notice to the connected second device that the communication rate between the relay device and the first device is being lowered.

According to the sixth aspect of the present disclosure, a lowering of the communication rate with the first device may be recognized at the second device.

A seventh aspect of the present disclosure is the relay device according to any of the first to sixth aspect, wherein the processor is configured to perform the reset processing when a communication load of the wired communication with the first device is less than a predetermined threshold.

According to the seventh aspect of the present disclosure, during the reset processing, loss of all messages being communicated by wired communication with the first device may be prevented.

An eighth aspect of the present disclosure is the relay device according to any of the first to seventh aspects, wherein the relay device is provided at a vehicle.

According to the eighth aspect of the present disclosure, in a network in a vehicle, because messages from the first device reach the second device even when reset processing is being performed at the first device, detection of an error by the second device may be prevented.

A ninth aspect of the present disclosure is a communication method that includes: by a processor, performing reset processing in relation to wired communication with a first device in response to a change in a communication rate of the wired communication with the first device; and in response to performing the reset processing, starting control to transmit a predetermined message to a second device even though there is no transmission from the first device, the predetermined message being expected to be transmitted from the first device to the second device.

According to the ninth aspect of the present disclosure, because messages from the first device reach the second device even when reset processing is being performed at the first device, detection of an error by the second device may be prevented.

A tenth aspect of the present disclosure is a non-transitory computer-readable recording medium storing a communication program executable by a computer to perform processing that includes: performing reset processing in relation to wired communication with a first device in response to a change in a communication rate of the wired communication with the first device; and in response to performing the reset processing, starting control to transmit a predetermined message to a second device even though there is no transmission from the first device, the predetermined message being expected to be transmitted from the first device to the second device.

According to the tenth aspect of the present disclosure, because messages from the first device reach the second device even when reset processing is being performed at the first device, detection of an error by the second device may be prevented.

According to the present disclosure, a relay device, a communication method and a recording medium recording a communication program may be provided that prevent detection of an error by another communication device, by transmitting messages from a communication device by proxy when reset processing is being performed at the communication device.

What is claimed is:

1. A relay device comprising:
a memory; and
a processor coupled to the memory,
the processor being configured to:
perform reset processing for communication with a first device in response to a change in a communication rate of wired communication with the first device;
in response to performing the reset processing, start control to transmit a predetermined message to a second device even though there is no transmission from the first device, the predetermined message being expected to be transmitted from the first device to the second device; and
as a proxy for the first device, perform control to transmit the predetermined message to the second device,
wherein content of the predetermined message comprises at least one of: (i) content that has arrived at the relay device from the first device before performing the reset processing; and (ii) content generated by the relay device acting as the proxy for the first device.

2. The relay device according to claim 1, wherein the processor is configured to start the control to transmit the predetermined message to the second device before starting the reset processing.

3. The relay device according to claim 1, wherein the processor is configured to start the control to transmit the predetermined message to the second device after starting the reset processing.

4. The relay device according to claim 1, wherein the reset processing is hardware reset processing.

5. The relay device according to claim 1, wherein the processor is configured to, at a time when the reset processing is completed, end the control to transmit the predetermined message to the second device even though there is no transmission from the first device.

6. The relay device according to claim 1, wherein the processor is configured to, in response to performing the reset processing, give notice to the second device that the communication rate between the relay device and the first device is being lowered.

7. The relay device according to claim 1, wherein the processor is configured to perform the reset processing when a communication load of the wired communication with the first device is less than a predetermined threshold.

8. The relay device according to claim 1, wherein the relay device is provided at a vehicle.

9. The relay device according to claim 1, wherein the processor is configured to select, as the predetermined message, at least one message set in advance as a priority message, priority of which is based on a system or equipment in which the relay device is installed.

10. A communication method comprising:
performing, by a processor of a relay device, reset processing for communication with a first device in response to a change in a communication rate of wired communication with the first device;
in response to performing the reset processing, starting, by the processor, control to transmit a predetermined message to a second device even though there is no transmission from the first device, the predetermined message being expected to be transmitted from the first device to the second device; and as a proxy for the first device, performing, by the processor, control to transmit the predetermined message to the second device, wherein content of the predetermined message comprises at least one of: (i) content that has arrived at the relay device from the first device before performing the reset processing; and (ii) content generated by the relay device acting as the proxy for the first device.

11. The communication method according to claim 10, wherein the control to transmit the predetermined message to the second device is started before starting the reset processing.

12. The communication method according to claim 10, wherein the control to transmit the predetermined message to the second device is started after starting the reset processing.

13. The communication method according to claim 10, further comprising:

selecting, by the processor, as the predetermined message, at least one message set in advance as a priority message, priority of the priority message being based on a system or equipment in which the relay device is installed.

14. A non-transitory computer-readable recording medium storing a communication program executable by a computer to perform processing comprising:

performing reset processing for communication with a first device in response to a change in a communication rate of wired communication with the first device;

in response to performing the reset processing, starting control to transmit a predetermined message to a second device even though there is no transmission from the first device, the predetermined message being expected to be transmitted from the first device to the second device; and as a proxy for the first device, performing control to transmit the predetermined message to the second device, wherein content of the predetermined message comprises at least one of: (i) content that has arrived at the computer from the first device before performing the reset processing;

and (ii) content generated by the computer acting as the proxy for the first device.

15. The non-transitory computer-readable recording medium according to claim 14, wherein the control to transmit the predetermined message to the second device is started before starting the reset processing.

16. The non-transitory computer-readable recording medium according to claim 14, wherein the control to transmit the predetermined message to the second device is started after starting the reset processing.

17. The non-transitory computer-readable recording medium according to claim 14, further comprising:

selecting, as the predetermined message, at least one message set in advance as a priority message, priority of the priority message being based on a system or equipment in which the computer is installed.

* * * * *